United States Patent
Myers et al.

(10) Patent No.: US 10,810,041 B1
(45) Date of Patent: Oct. 20, 2020

(54) PROVIDING COMPUTING WORKFLOWS TO REMOTE ENVIRONMENTS

(71) Applicant: MicroStrategy Incorporated, Vienna, VA (US)

(72) Inventors: Clayton Myers, Oak Hill, VA (US); Andrew Smith, Oakton, VA (US); Richard Gardner, Leesburg, VA (US); Timothy Lang, McLean, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 16/553,442

(22) Filed: Aug. 28, 2019

(51) Int. Cl.
| | | |
|---|---|---|
| *G06F 9/50* | (2006.01) | |
| *G06F 9/48* | (2006.01) | |
| *G06F 8/65* | (2018.01) | |
| *H04L 29/08* | (2006.01) | |
| *G06F 9/4401* | (2018.01) | |

(52) U.S. Cl.
CPC .............. *G06F 9/4843* (2013.01); *G06F 8/65* (2013.01); *G06F 9/4416* (2013.01); *H04L 67/34* (2013.01)

(58) Field of Classification Search
CPC ........ G06F 9/4843; G06F 9/4416; G06F 8/65; H04L 67/34
See application file for complete search history.

(56) References Cited

U.S. PATENT DOCUMENTS

| | | |
|---|---|---|
| 6,816,871 B2 | 11/2004 | Lee |
| 7,581,011 B2 | 8/2009 | Teng |
| 7,802,174 B2 | 9/2010 | Teng et al. |
| 7,937,655 B2 | 5/2011 | Teng et al. |
| 9,311,161 B2 | 4/2016 | Jagtap |
| 9,762,450 B2 | 9/2017 | Xie |
| 9,811,849 B2 | 11/2017 | Bursey |
| 2004/0068424 A1 | 4/2004 | Lee et al. |
| 2008/0115195 A1* | 5/2008 | Malek ............... G06Q 10/06 726/4 |
| 2010/0162406 A1* | 6/2010 | Benameur ......... G06Q 10/06 726/26 |
| 2010/0250487 A1* | 9/2010 | Gabriel ............. G06Q 10/06 707/608 |
| 2015/0178052 A1 | 6/2015 | Gupta et al. |

* cited by examiner

*Primary Examiner* — Kim T Nguyen
(74) *Attorney, Agent, or Firm* — Fish & Richardson P.C.

(57) ABSTRACT

Methods, systems, and apparatus, including computer programs encoded on a computer storage medium, for providing workflows to remote environments. In some implementations, data storage storing multiple workflows is accessed, where each of the workflows indicates a set of computer operations to be performed. Catalog data identifying workflows, from among the multiple workflows, that are available is provided to a computer system. A request for a workflow from among the workflows identified by the catalog data is received from the computer system. The requested workflow is sent to the computer system in response to the request.

20 Claims, 4 Drawing Sheets

PROVIDING COMPUTING WORKFLOWS TO REMOTE ENVIRONMENTS

BACKGROUND

Servers and other computers experience a wide variety of conditions. Many computer systems require periodic or ongoing maintenance to ensure proper operation and to deal with errors and limitations.

SUMMARY

In some implementations, a set of computing workflows can be defined to facilitate the management or operation of computer systems. A workflow publishing server is configured to distribute computing workflows to third-party servers and users of third-party servers. The workflow publishing server may send a listing of available workflows to other servers. The workflow publishing server may receive requests for one or more workflows indicated in the listing, and, in response, provide the requested workflows. Administrators can select from among the sets of available workflows to enable custom combinations of functionality at the systems they manage.

The workflows can be configured to allow administrators to modify the received workflows. For example, an administrator may modify workflows to better address particular problems or errors experienced by the a server, to customize how the workflows are to be implemented, to select a data source to be used by a workflow, to select a destination to be used by a workflow, to link multiple workflows so the execute together, etc.

In some implementations, the workflow publishing server workflows a remote server based on an analysis of error logs, error reports, and/or server manager logs received from the remote server. In analyzing the error logs, error reports, and/or server manager logs, the workflow publishing server may leverage one or more machine learning to identify conditions present at the remote server and to select relevant workflows.

A workflow can be an executable or interpretable data package that specifies a set of computing operations to be performed, potentially along with logic to adaptively or selectively vary which operations are performed and how the operations are performed depending on conditions at a computer system. For example, a workflow can include instructions for a computer system to perform a sequence of actions or functions. The workflow can specify data to be acquired (e.g., to determine current settings, current performance metrics, etc.) and conditions to be evaluated, which can result in different sets of operations being performed by the computer system. Workflows can have many different uses, such as to install patches, change settings, fix causes of errors, optimize performance, resolve incompatibilities, correct dependencies, refresh caches, optimize data sets, monitor performance, and more. Frequently, a workflow is designed to cause a specific purpose or result when run. An administrator can select a workflows to be run periodically to automate maintenance, or workflows may be run on-demand.

A workflow can be packaged in a standard, lightweight form that can be interpreted or executed without being compiled. Part of a workflow can be a collection of commands to be performed, similar to a script or batch file. As discussed further below, a workflow can have various types of logic integrated into the workflow that allow the execution of the commands to be varied according to the context of the computer for which it is run. For example, a workflow may include different mutually exclusive branches representing different sets of commands, and the computer that executes the workflow can determine which branch is appropriate when the workflow is run. As another example, the workflow can include parameters (e.g., fields, variables, etc.) that are adaptively set for the particular computer running the workflow. These parameters for execution of the workflow may be edited and customized by an administrator, or may be set by the operation of the workflow based on data collected by the workflow through interaction with elements of the computer system. The commands that a workflow instructs to be performed can be commands to invoke functions of software already installed on a computer system, such as functions of an operating system, applications, tools, and so on that are already installed on the computer system. A workflow may also initiate other types of actions, such as interacting with another system using an application programming interface (API), changing settings of the computer or connected system, and so on. In some implementations, the workflow itself may include executable code to be run.

The workflow can be packaged as a module that is redistributable, and so does not need an installation process to be used. Additionally, the module can be editable so that users can tailor the operation for their respective needs. In some implementations, the workflow may designate fields that are customizable by a user. For example, the workflow can include fields for time periods to take actions, resources (e.g., files, folders, devices, etc.) that operations of the workflow act on, values for settings, and so on. Further, the workflow can be editable to add, remove, and modify operations of the workflow.

A server system may provide a configuration interface (e.g., through an application on a client device, a web page, a web application, etc.) that allows an administrator to configure the operation of the server system. The management interface can be configured to communicate with a remote management server to request and receive workflow modules, or have workflow modules and workflow lists pushed from the management server. Once a workflow is received, the configuration interface can include features to request, review, edit, activate, and deactivate workflow modules. For example, the configuration interface can enable a user to view the properties of a specific workflow module, view the operations the workflow module is configured to perform, edit those operations and/or resources the operations use or act on, and save any changes to the customized workflow module. The configuration interface can enable the user to initiate running the workflow, for example, by manually initiating execution, by setting the workflow to be run at a scheduled time (e.g., once or on a recurring schedule), or by setting the workflow to be run in response to detecting one or more conditions (e.g., to run a workflow when load exceeds a threshold, or when a particular type of error occurs, or for another condition).

Each workflow may include or otherwise be associated with a set of metadata that specifies the applicability of the workflow to different systems. For example, the metadata may indicate a type of result achieved by the workflow, a set or range of version codes for software that the workflow is compatible with, a type of error or condition that the workflow is configured to address, user permissions or security credentials needed to run the workflow, dependencies needed by the workflow, a set of applications used by the workflow, a set of settings changed by the workflow, and so on. This metadata can enable computer systems to determine the applicability of different workflows to particular systems.

In one general aspect, a method includes: accessing data storage storing multiple workflows, where each of the workflows indicates a set of computer operations to be performed; providing, to a computer system, catalog data identifying workflows, from among the multiple workflows, that are available to the computer system; receiving, from the computer system, a request for a workflow from among the workflows identified by the catalog data; and sending, to the computer system, the requested workflow in response to the request.

Implementations may include one or more of the following features. For example, in some implementations, providing the catalog data identifying the workflows includes publishing the catalog data to multiple systems, one of which is the computer system.

In some implementations, providing the catalog data identifying the workflows includes pushing, by a server, the catalog data to the computer system.

In some implementations, the method further includes: receiving a request for the catalog data; where providing the catalog data identifying the workflows includes providing, to the computer system, the catalog data in response to receiving the request for the catalog data.

In some implementations, the data storage storing multiple workflows stores metadata associated with the multiple workflows; and the catalog data includes metadata associated with each of the identified workflows. In these implementations, the metadata indicates at least one of software the associated workflow applies to, conditions the associated workflow applies to, permissions needed for the associated workflow, a description for the associated workflow, or an error addressed by the associated workflow.

In some implementations, one or more workflows of the multiple workflows indicate a sequence of multiple operations to be performed in a predetermined order.

In some implementations, one or more workflows of the multiple workflows includes multiple conditional operations that are designated to be performed when corresponding conditions are satisfied.

In some implementations, one or more workflows of the multiple workflows includes a chain of conditional operations includes (i) a first operation and a first condition and (ii) a second operation and a second condition. In these implementations, the performance of the first operation is dependent on the first condition being satisfied; and the performance of the second operation is dependent on the second condition and the first condition being satisfied.

In some implementations, one or more workflows of the multiple workflows specify multiple alternative sequences of operations to be performed based on conditions present when the one or more workflows are processed.

In some implementations, one or more workflows of the multiple workflows specify operations that involve executing one or more scripts or executables.

In some implementations, one or more workflows of the multiple workflows specify operations that include shutting down or restarting a server environment.

In some implementations, one or more workflows of the multiple workflows specify operations that involve accessing data from a data repository or data indicating operational characteristics of a data repository.

In some implementations, at least one of the workflows of the multiple workflows represents a template of operations to be customized for a particular server environment.

In some implementations, one or more workflows of the multiple workflows address specific errors or conditions of server environments, and have metadata indicating the errors or conditions they address.

In some implementations, the method further includes: identifying a configuration of the computer system; and providing a customized subset of the identified workflows based on the configuration of the computer system.

In some implementations, providing a customized subset of the identified workflows is based on at least one of a software version for software used by the computer system, a setting of the computer system, a usage pattern of the computer system, an error encountered by the computer system, or a limitation encountered by the computer system.

In some implementations, the method further includes: receiving information, from the computer system, indicating a log of actions performed by the computer system; determining a level of similarity of actions in the log with operations in a workflow of the multiple workflows; determining that the level of similarity satisfies a threshold; and providing, to the computer system, the workflow or a recommendation for the workflow based on determining that the level of similarity satisfies the threshold.

In some implementations, the method further includes: receiving data, from the computer system, indicating errors or conditions of a server system; identifying one or more workflows of the multiple workflows that are configured to address the errors or conditions; and providing, to the computer system, the workflow or a recommendation for the workflow.

In some implementations, the method further includes: receiving a query from the computer system; determining a workflow of the multiple workflows based on the query; and providing, to the computer system, the workflow or a recommendation for the workflow in response to receiving the query.

In another general aspect, a method is performed by one or more computers. The method includes: sending, by the one or more computers and to a server system, a request for one or more workflows, where the server system provides workflows that each specify a set of operations to be performed by a computer system; receiving, in response to the request, a particular workflow; modifying the particular workflow based on user input indicating a modification to the particular workflow; determining that one or more predetermined conditions corresponding to the modified workflow have occurred; and in response to determining that one or more predetermined conditions corresponding to the particular workflow have occurred, initiating performance of the operations of the modified workflow.

Implementations may include one or more of the following features. For example, in some implementations, the method further includes providing data for an interface enabling a user to select, obtain, and apply one or more workflows from among a set of multiple workflows provided by the server system.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
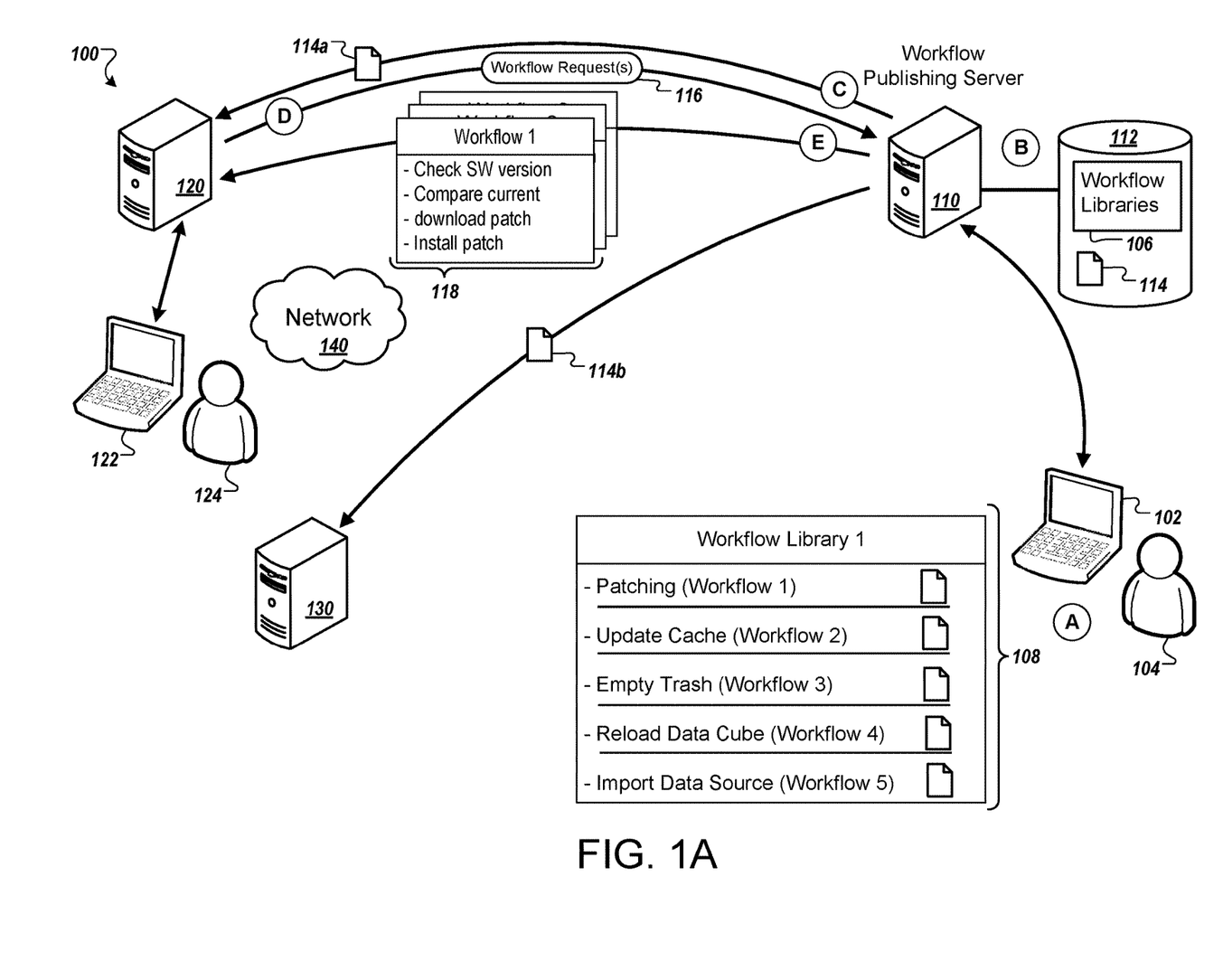
FIGS. 1A-1B are diagrams that illustrate an example system for providing workflows to remote environments.
Figure 1B:
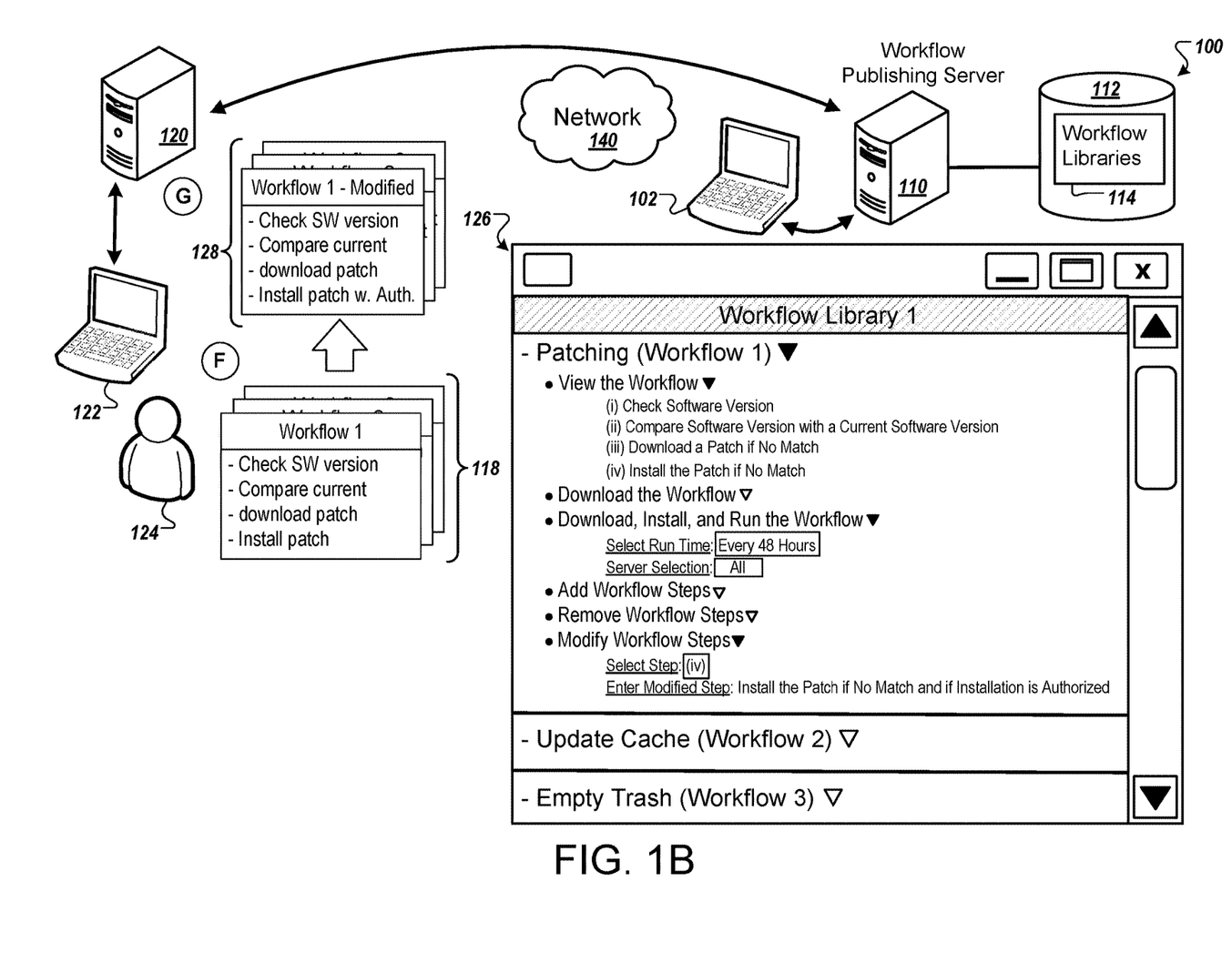

FIGS. 1A-1B are diagrams that illustrate an example system 100 for providing workflows to remote environments, such as third-party servers. The system 100 includes a workflow publishing server 110 and an administrator device 102. The system 100 is able to transmit one or more workflows to servers 120 and 130 over a network 140, so that the servers 120 and 130 can customize and run the received workflows.

The system 100 allows the workflow publishing server 110 to push one or more workflows to the third-party servers 120 and 130. The system 100 also allows one of the third-party servers 120 and 130 to pull one or more workflows from the workflow publishing server 110. The workflow publishing server 110 may provide various different systems with a listing of workflows that are available. When a system receives a workflow from the workflow publishing server 110, the workflow can be customized before it is run. In general, workflows each specify a set of operations to be performed. The workflow can designate the performance of operations to be conditional on the occurrence of particular events or conditions. A workflow may contain mutually exclusive alternatives or branching sets of operations, where one set of operations is performed instead of another set based on the conditions that are satisfied.

FIGS. 1A-1B also illustrate a flow of data, shown as stages (A) to (I), with each representing a step in an example process. Stages (A) to (I) may occur in the illustrated sequence, or in a sequence that is different from the illustrated sequence. For example, some of the stages may occur concurrently.

The administrator device 102 can be a computing device, such as a desktop computer, a laptop computer, a mobile phone, a smart phone, a personal digital assistants (PDA), a tablet computer, or other computing devices. The administrator device 102 can communicate with the workflow publishing server 110 over, for example, the network 140.

The network 140 can include public and/or private networks and can include the Internet.

The workflow publishing server 110 has associated data storage 112 storing one or more workflow libraries 106. The workflow publishing server 110 may include one or more computing devices. The workflow publishing server 110 communicates with servers 120 and 130 over the network 140. In some implementations, one or more computers of the workflow publishing server 110 may communicate with the administrator device 102 and one or more other computers may perform other tasks, such as communicating with the servers 120 and 130. The workflow publishing server 110 may communicate with the servers 120 and 130 through one or more application programming interfaces (APIs).

The servers 120 and 130 may each include one or more computing devices. The servers 120 and 130 are remote with respect to the workflow publishing server 110. The servers 120 and 130 may each be part of a cloud computing platform (e.g., Amazon Web Services (AWS), Microsoft Azure, and so on).

In the example of FIGS. 1A-1B, the workflow publishing server 110 provides workflows for the management of a computing platform that includes software run by the servers 120 and 130. For example, the platform may be a data analytics software platform that includes one or more applications or services, e.g., web server functionality, functionality to access data repositories, query response functionality, functionality to generate visualizations, and so on. The servers 120 and 130 may each run the software of the platform in independently managed systems, for example, for different companies and organizations. As a result, the servers 120 and 130 represent systems that are managed and operated independently from each other and from the workflow publishing system 110. The workflow publishing server 110 can make the workflows available so that the administrators of third-party systems, e.g., servers 120 and 130, can separately select and run the workflows to enhance the maintenance and operation of the software platform. In some implementations, the workflow publishing server 110 is operated by or is affiliated with the provider of the software platform. The workflows may be created, tested, and/or validated before being made available to other systems by the workflow publishing server 110. For example, the workflows can be trusted or certified sets of operations for maintaining or optimizing the software platform.

The techniques disclosed in this document can increase the efficiency and accuracy of server system management. One or more workflows can be accessed, implemented, and processed in order to automate many tasks that would otherwise require significant manual input. In addition, by reducing the amount of manual input needed, server system management using the disclosed techniques is less prone to errors and/or reaction inconsistencies. The disclosed techniques further improve the efficiency and accuracy of server system management by, in some implementations, recommending specific workflows for a particular system based on of their server system and/or their determined needs. The recommended workflows may be determined based on an analysis of one or more error reports or error logs for a system. The recommended workflows may be determined based on analysis of previous actions taken, such as a log of actions that an administrator took to maintain or adjust a server. The recommended workflows may be selected by leveraging one or more machine learning. The disclosed techniques further improve the efficiency and accuracy of server system management by allowing the customization of workflows to the specific needs of a particular administrator or system.

The techniques disclosed in this document can increase the reliability of server systems. Workflow operations may be created and/or customized such that they are performed automatically when certain conditions are satisfied. These operations may include, for example, updating software, installing patches, importing new data, or removing old data that can increase and maintain the reliability of server systems. Conditions which may trigger the performance of these operations may include, for example, a determination that a software update or patch has come available, if a certain amount of time has passed since the operation was last performed, or a determination that new data has come available. Accordingly, server system reliability is improved by ensuring, for example, that the server system is using the latest software, has the latest patches installed, is using the newest available data, etc. In some implementations, the disclosed system is able to recommend one or more workflows to be implemented in a particular server system. The disclosed system may recommend workflows when it determines that the workflow may increase the reliability of the server system or increase the efficiency of the server system, e.g., through an analysis of the server system's error reports or server manager logs.

As shown in FIG. 1A, in stage (A), a workflow library 106 is created or updated. This can involve creating, modifying, testing, and/or validating workflows to be included in the workflow library 106.106 As shown, a first workflow library 106 includes five workflows: a first workflow for patching software ("Workflow 1"), a second workflow for updating a cache of a computer system ("Workflow 2"), a third workflow for emptying a trash folder of a file system ("Workflow 3"), a fourth workflow for reloading an online analytical processing (OLAP) data cube ("Workflow 4"), and a fifth workflow for importing a data source ("Workflow 5"). The administrator 104 may upload the new or modified workflow library 106 to the workflow publishing server 110 over the network 140 or over a different network Validating or testing a workflow of a workflow library may involve performing one or more of the operations within a workflow (or all operations within a workflow) on a testing environment. The testing environment may be a computer, a computing system, a server environment, a virtual machine, etc. During validation, the operation of the workflow can be tested to ensure proper results are achieved, that security is maintained, compatibility is achieved with an appropriate set of software versions or system configurations, etc.

The workflows in the workflow library 106 can be created on the device 102 or any of various other devices and uploaded to the workflow publishing server 110 for storage and distribution.

In stage (B), the workflow publishing server 110 adds the new or modified workflows to the library 106, which is stored in the data storage 112. This may involve replacing a previous version of the workflow library 106 or updating a previous version of the workflow library 106.

When the workflow publishing server 110 adds the new or modified workflow library 106 to the workflow libraries 106, it may also generate or update a workflow listing 114. The workflow listing 114 may list all workflows included in the workflow libraries 106. The workflow listing 114 may list all workflows from a particular workflow library. For example, there may be separate workflow listings for each workflow library.

The workflow listing 114 may include information about each of the workflows within the workflow listing 114 as is discussed in more detail below with respect to FIG. 2. This information may include metadata, such as a name of the workflow, a purpose of the workflow or an error that the workflow addresses, a description of the operations within the workflow (e.g., which may also include required conditions for the workflow to be performed), a list of persons who can initiate running of the workflow, security permissions for the workflow, and software versions that the workflow is compatible with.

In stage (C), the workflow publishing server 110 sends workflow listings 114a and 114b to the servers 120 and 130 respectively. The workflow listings 114a and 114b can represent a catalog of the available workflows that can be obtained from the workflow publishing server 110. In some cases, the workflow listings 114a and 114b include all workflows, and in other cases they may represent customized subsets of the total set of workflows, e.g., subsets determined to have appropriate compatibility with or relevance to the servers 120 and 130.

The workflow listings 114a and 114b may be sent by the workflow publishing server 110 to the servers 120 and 130 respectively over the network 140. Here, the workflow publishing server 110 pushes the workflow listings 114a to the server 120, and the workflow listing 114b to the server 130. The workflow publishing server 110 may push the workflow listings 114a and 114b if they have been recently updated (e.g., new workflows have been added, a workflow library which corresponds with the workflow listing has been updated or added, etc.). The workflow publishing server 110 may push these workflow listings 114a and 114b periodically. For example, the workflow publishing server 110 may have scheduled to send the server 120 a workflow listing every two days. The schedule for the server 130 may be different than the schedule of the server 120. For example, the workflow publishing server 110 may have scheduled to send the server 130 a workflow listing every week as opposed to every two days for the server 120.

In some implementations, a server, such as the server 120 or 130, requests a workflow listing from the workflow publishing server 110. The third-party server may schedule workflow listing requests so that they are sent periodically.

In some implementations, different workflow listings 114a and 114b are provided to the servers 120 and 130. For example, the servers 120 and 130 may run different versions of software or have different configurations, so that different sets of workflows are applicable to each. The workflow publishing server 112 can select a customized subset of the workflows in the workflow library 106 for each server, based on known characteristics of the servers. For example, the servers 120 and 130 can periodically provide configuration data indicating software installed, versions of the software, configuration settings, load levels, usage logs, error logs, and so on. From this information, the workflow publishing server can filter the workflow listing 114 so that each workflow listing 114a, 114b has a customized, filtered subset of the workflows.

In some implementations, the workflow listings 114a and 114b are listings of recommended workflows that the workflow publishing server 110 selects as being recommended for the servers 120 and 130. In these implementations, the workflow publishing server 110 may receive (e.g., periodically) error reports or error logs experienced by the server 120 and/or the server 130, and server manager logs from the server 120 and/or 130. The workflow publishing server 110 may analyze these error reports, error logs, and/or server manager logs, and recommend one or more workflows to the respective third-party server.

An analysis of these error reports, error logs, and/or server manager logs may be used to identify workflows that solve specific problems experienced by the respective third-party server and/or workflows that solve similar problems experienced by the respective third-party server. For example, an analysis of an error report of the server 120 may reveal that a number of errors are occurring because the software is out of date. In this example, the workflow publishing server 110 may search through the metadata of the workflows in the workflow libraries 106 to identify any workflows that are related to updating server software or patching server software, and provide the identified workflows to the server 120.

A recommended workflow does not need to solve the exact same problem to be recommended because, as will be discussed in more detail below with respect to FIG. 1B, the workflow can be customized for the particular server that it is to be implemented in.

An analysis of these error reports, error logs, and/or server manager logs may reveal workflows that can increase system stability (e.g., if it is determined that one or more errors are due to a high server load, or a high degree of fluctuation in server load, etc.). An analysis of these error reports, error logs, and/or server manager logs may reveal workflows that can reduce user input (e.g., if it is determined that server managers or users are repeatedly doing tasks that could be automated by a workflow, if it is determined that the one or more errors are due to human input error, or if it is determined that the one or more errors are due to inconsistent human oversight). The workflow publishing server 110 may filter out workflows from the recommended workflows if they are incompatible with the respective third-party server, e.g., the workflow requires a different software version than what is installed on the server. The workflow publishing server 110 may provide these recommended workflows to the respective third-party servers as part or all of the workflow listings 114a and 114b.

In some implementations, the administrator 104 may select the one or more workflows to recommend to the servers 120 and 130 based on the results of analysis performed by the workflow publishing server 110 on the respective error reports, error logs, critical log files (e.g., logs for an application server, logs for an intelligence server, logs for queue producers, logs for queue consumers, etc.), core files, crash dumps, and/or server manager logs.

In some implementations, the workflow publishing server 110 leverages one or more machine learning in order to analyze the respective error reports, error logs, critical log files (e.g., logs for an application server, logs for an intelligence server, logs for queue producers, logs for queue consumers, etc.), core files, crash dumps, and/or server manager logs associated with, for example, the servers 120 and 130. In these implementations, the workflow publishing server 110 may capture other attributes and/or characteristics of the servers 120 and 130 such as, for example, the operating system (OS) used, the version of the OS used, applications or services run, versions of applications or services run, hardware characteristics, etc. These attributes and/or characteristics may be made available to and used by the one or more machine learning. In these implementations, the workflow publishing server 110 may feed the error reports, error logs, critical log files, core files, crash dumps, server manager logs monitor, attributes, and/or characteristics associated with, for example, the servers 120 and 130 to the one or more machine learning to see if the server conditions matched known defects. Using this information, the one or more machine learning may determine one or more server conditions. The one or more machine learning may represent the one or more server conditions as a pattern.

The output of the one or more machine learning may be used by the workflow publishing server 110 or the administrator 104 to select one or more workflows for recommendation. For example, if the observed server conditions/pattern matched a previously known defect, the one or more machine learning may recommend a known workflow associated with those conditions. If the observed server conditions/pattern did not match a known defect, then an analysis would be done for these new conditions/new pattern, and a new workflow may be generated to address these new conditions/new pattern. The analysis may be performed by a user of the workflow publishing server 110. The new workflow may be generated by a user of the workflow publishing server 110. The analysis may be performed automatically by the workflow publishing server 110 through, for example, trial and error and/or leveraging one or more machine learning to determine which workflows are likely work based on, for example, what workflows are associated with conditions similar to the observed conditions, what workflows have a high rate of success, etc. For example, the workflow publishing server 110 may attempt to use existing workflows to see if any have a beneficial effect on the server conditions. The workflow publishing server 110 may test the existing workflows in the order of which are determined to have the highest likelihood of success based on, for example, leveraging the one or more machine learning. If one or more workflows are determined to have a beneficial effect on the observed server conditions (e.g., less defects, less severe defects, better performance, etc.), the workflow publishing server 110 may associate those one or more workflows with the observed conditions/pattern, e.g. associate those one or more workflows with the specific defect detected.

The one or more machine learning may include one or more machine learning models. The one or more machine learning models may include an unsupervised learning model.

The workflow listing 114a may be the same or different from the workflow listing 114. The workflow listing 114 may be modified for the server 120 in order to generate the workflow listing 114a. For example, the workflow listing 114a may contain the workflows found in the workflow listing 114 that are compatible with the software of server 120. Similarly, the workflow listing 114b may be the same or different from the workflow listing 114. The workflow listing 114 may be modified for the server 130 in order to generate the workflow listing 114b. For example, the workflow listing 114b may contain the workflows found in the workflow listing 114 that are compatible with the software of server 130.

In stage (D), after having received the workflow listing 114a, a user 124 of the client device 122 may select one or more workflows from the workflow listing 114a for download from the workflow publishing server 110. In selecting one or more workflows from the workflow listing 114a, one or more workflow requests 116 are generated by the server 120 and sent to the workflow publishing server 110. The one or more workflow requests 116 may contain a name or other indication of the one or more selected workflows, and/or a name or other indication of the source of the one or more workflows, such as a name or other indication of the one or more workflow libraries that correspond with the one or more selected workflows.

The one or more workflow requests 116 may contain additional information, such as information about the server 120. This additional information may contain, for example, the software version(s) used by the third-party server, error logs or reports related to the third-party server, server manager logs, storage capacity of the third-party server, remaining storage space of the third-party server, performance information related to all or part of the third-party server (e.g., bandwidth, load experienced, amount of memory, number of processors, type of processors, etc.), The one or more workflow requests 116 may be sent to the workflow publishing server 110 over the network 140.

In some implementations, the one or more workflow requests 116 do not specifically name or identify one or more workflows. In these implementations, the workflow requests

116 may contain a query for workflows for the workflow publishing server 110. The query may include information naming or describing a specific error, condition, or other issue experienced by the server 120. The workflow publishing server 110 may access the workflow libraries 106 through the data storage 112, and compare the query information to the metadata for each of the workflows. In comparing the query information to the workflow metadata, the workflow publishing server 110 may identify one or more workflows that specifically address the error, condition, or other issue experienced by the server 120, and/or one or more workflows that are related to the error, condition, or other issue experienced by the server 120. The workflow publishing server 110 may leverage one or more machine learning in identifying the one or more workflows.

In stage (E), in response to receiving the one or more workflow requests 116, the workflow publishing server 110 sends the requested workflows 118 (or a subset of the requested workflows) to the server 120. The workflow publishing server 110 may first analyze the received one or more workflow requests 116 to determine which workflows are being requested. The workflow publishing server 110 may access the data storage 112 to obtain the requested workflows 118 in preparation of sending the requested workflows 118 to the server 120. Here, the user 124 had requested three workflows: including Workflow 1, Workflow 2, and Workflow 3. These three workflows make up the requested workflows 118 and are sent to the server 120. In addition to sending the workflows, the workflow publishing server 110 may provide instructions for installing and running each of the workflows in the requested workflows 118.

In some implementations, the workflow publishing server 110 removes one or more workflows from the requested workflows 118 due to a determination that one or more workflows are incompatible with the server 120. This subset of the requested workflows 118 may be sent to the server 120 in place of the requested workflows 118. In these implementations, a notification may be provided to the server 120 indicating that one or more workflows were not sent due to incompatibility.

In some implementations, the workflow publishing server 110 pushes one or more workflows to the server 120 or the server 130 without the need for any workflow requests, such as the one or more workflow requests 116. In these implementations, the workflow publishing server 110 may push recommended workflows in response to analysis of a third-party server's error reports, error logs, and/or server manager logs. The workflow publishing server 110 or the administrator 104 may identify which workflows to recommend in accordance with the methods described above with respect to stage (C).

As shown in FIG. 1B, in stage (F), the user 124, through an interface 126 of the client device 122, inspects the requested workflows 118 and generates a set of modified workflows 128 from the requested workflows 118. Here, the user 124 has selected Workflow 1 in the interface 126, allowing the user 124 to inspect Workflow 1 and modify it. The user 124 has selected the option to "View the Workflow," revealing the operations contained within Workflow 1. These operations include a first operation to check the software version of the server, a second operation to compare the software version with a current software version, a third operation to download a software patch if the checked software version does not match the current software patch, and a fourth operation to install the software patch if the checked software version does not match the current software patch. Other options that the user 124 has not selected include an option to download the workflow, an option to add workflow steps (e.g., add additional operations to Workflow 1 that may or may not be conditional, or add alternative operations to the workflow), and an option to remove workflow steps (e.g., remove an operation from Workflow 1).

An option that the user 124 has selected is an option to download, install, and run the workflow. By selecting this option, the user 124 is presented a field to select or enter a run time, and a field to select or enter the specific servers or server environments that Workflow 1 should be installed on or otherwise implemented in. In the run time field, the user 124 has selected to run Workflow 1 every 48 hours. The user 124 may have been able to select or enter other options, such as every 12 hours, every 24 hours, every week, every month, every year, once—immediately, once—with a delay (e.g., a delay of 1 hour, 2 hours, 12 hours, 1 day, 1 week, etc.), etc. In the server or server environment field, the user 124 has selected or entered "all." Accordingly, the user 124 has chosen for Workflow 1 to be installed and run on all of server 120's servers and/or server environments, or on all of server 120's compatible servers and/or server environments.

An option the user 124 has selected is an option to modify workflow steps. By selecting this option, the user 124 is presented a field to select or enter a step, e.g., an operation, to modify and a field to enter the modification(s). Here, the user 124 has selected or entered the fourth operation, the operation to install the software patch if the checked software version does not match the current software patch. The user 124 has modified the fourth operation so that it now includes an additional condition that the installation of the patch must also be authorized by a server manager or admin.

The user 124 may be able to modify the workflows in other ways. For example, the user 124 may be able to select from a list of recommended or frequently used operations. This list may be presented to the user 124 on the interface 126. When the user selects an operation from the list, the operation may replace a currently selected operation or may be added to the operations of the corresponding workflow. The user 124 may be able to drag one or more operations from the list into the workflow. The user 124 may be able to rearrange operations in the workflow by, for example, dragging them into different positions. The user 124 may be able to modify a workflow by entering code that is then added to the computer code corresponding with the workflow, e.g., in order to add one or more new operations to the workflow, add one or more conditions to the workflow or to individual operations in the workflow, etc. The user 124 may be able to modify a workflow by modifying the computer code corresponding with the workflow, e.g., in order to modify existing operations or conditions, remove existing operations or conditions, etc.

The operations of the workflow may be conditional on one or more events being satisfied. These conditions may be temporal conditions, e.g., a date, an elapse of a certain amount of time, etc. These conditions may be satisfied through a triggering event, e.g., the occurrence of an error or a particular error, an instruction or action by a server manager or administrator, a state of the server system, a server load threshold being met, etc. These conditions may be satisfied through the successful performance of one or more higher order operations in the set of operations, e.g., operations that are to be performed before the operation at issue. These conditions may be predetermined. These conditions may be set by the user 124 through the interface 126.

Similarly, the workflow itself may be conditional on one more events being satisfied before it is processed. These conditions may be temporal conditions, e.g., a date, an elapse of a certain amount of time, etc. These conditions may be satisfied through a triggering event, e.g., the occurrence of an error or a particular error, an instruction or action by a server manager or administrator, a state of the server, a server load threshold being met, etc. These conditions may be satisfied through the successful performance of an operation of another workflow or of the successful processing of another workflow. These conditions may be predetermined. These conditions may be set by the user 124 through the interface 126. These conditions may include the occurrence of an event, the nonoccurrence of an event, particular data being identified, particular data not being identified, particular data being matched, particular data not being matched, the time of day, the day of the week, the time of year, a status of a server, the load on a server reaching a threshold level, the security permissions of a user, etc.

The workflows may each contain branching or alternative operations. For example, Workflow 1 may contain a set of alternative operations where a match is found between the checked software version and the current software version. In this example, Workflow 1's alternative operations may include an operation to schedule a check for updates one week from now, an operation to generate a notification indicating that the server is currently running the most up-to-date software, and an operation to generate a notification indicating the scheduled software check if the software check is successfully scheduled. As demonstrated in the example, the branch or path of operations that is performed during the processing of a workflow, such as during the processing of Workflow 1, may depend on the particular conditions satisfied and/or on the successful performance of a higher order operation.

By modifying (e.g., customizing) the requested workflows 118 for the server 120, or for particular servers or server environments within or part of the server 120, the user 124 generates the set of modified workflows 128. In some implementations, the modified workflows 128 are generated in response to the user saving or submitting their modifications to the requested workflows 118.

The user 124 may be able to modify the requested workflows 118 in other ways. For example, the user 124 may be able to select a source to be used by a particular workflow, such as a data source. For example, the user 124 may be able to select a destination to be used by a particular workflow. For example, the user 124 may be able to string multiple workflows together. For example the user 124 may be able to select a script to be used by or with a particular workflow.

At stage (G), the user 124 implements the modified workflows 128 into the server 120. Implementing the modified workflows 128 in the server 120 may involve installing the modified workflows on the server 120, on one or more particular servers part of the server 120, or one or more particular server environments within or part of the server 120. Implementing the modified workflows 128 in the server 120 may involve running (e.g., processing) the modified workflows 128, scheduling one or more times to run each of the modified workflows 128, or setting one or more other conditions (e.g., triggering events) for each of the modified workflows 128 that when satisfied result in running the modified workflows 128. Implementing the modified workflows 128 in the server 120 may involve stringing a workflow from the modified workflows 128 to another workflow, such that the processing of one of the strung workflows is a precondition to the processing of the other strung workflow.

Figure 2:
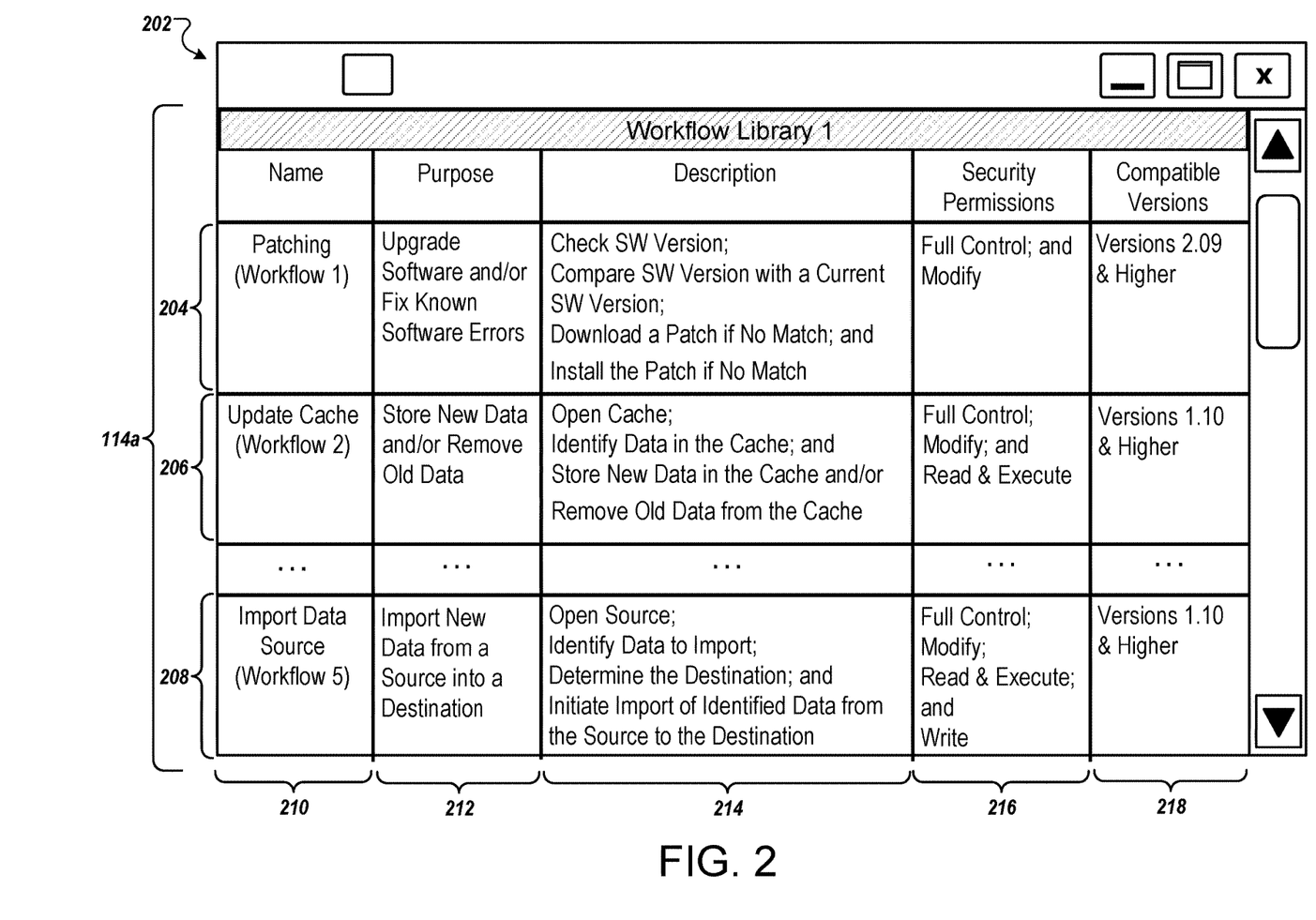
FIG. 2 is a diagram that illustrates example interface displaying a workflow listing.

FIG. 2 is a diagram that illustrates example interface 202 displaying the workflow listing 114a as previously shown in FIG. 1 a in more detail. As previously mentioned, the workflow listing 114a may contain metadata for each of the workflows within the listing. The metadata may include a name of the workflow, a purpose of the workflow or an error that the workflow addresses, a description of the operations within the workflow (e.g., which may also include required conditions for operation performance), a list of persons who can access the workflow, security permissions for the workflow, and software versions that the workflow is compatible with.

As shown, the workflow listing 114a includes a first row 204 for Workflow 1, a second row 206 for Workflow 2, and a final row 208 for Workflow 5. The workflow listing 114a also includes a column 210 for the names of each of the workflows, a column 212 for the purpose or error to be addressed by each of the workflows, a column 214 for the descriptions and/or required conditions of each of the workflows, a column 216 for the security permissions required for each of the workflows, and a column 218 for the compatible software versions for each of the workflows.

As shown, different workflows may require different security permissions. For example, as shown in column 216 of row 204, Workflow 1 requires a higher security permission of "Full Control" or "Modify" in order to install and/or process Workflow 1, whereas, as shown in column 216 or row 208, Workflow 5 allows many more security permissions to install and/or process Workflow 5. The reason why Workflow 1 may require higher security permissions than Workflow 5 may be due to the operations within each of the workflows. The operations of Workflow 1, as can be seen in column 214 of row 204, involve downloading and installing software which may be viewed as high risk operations (or high risk when compared with the operations of Workflow 5). The operations of Workflow 5, as can be seen in column 214 of row 208, involve identifying and importing data, which may be viewed as low or medium risk operations (or low or medium risk when compared with the operations of Workflow 1).

Figure 3:
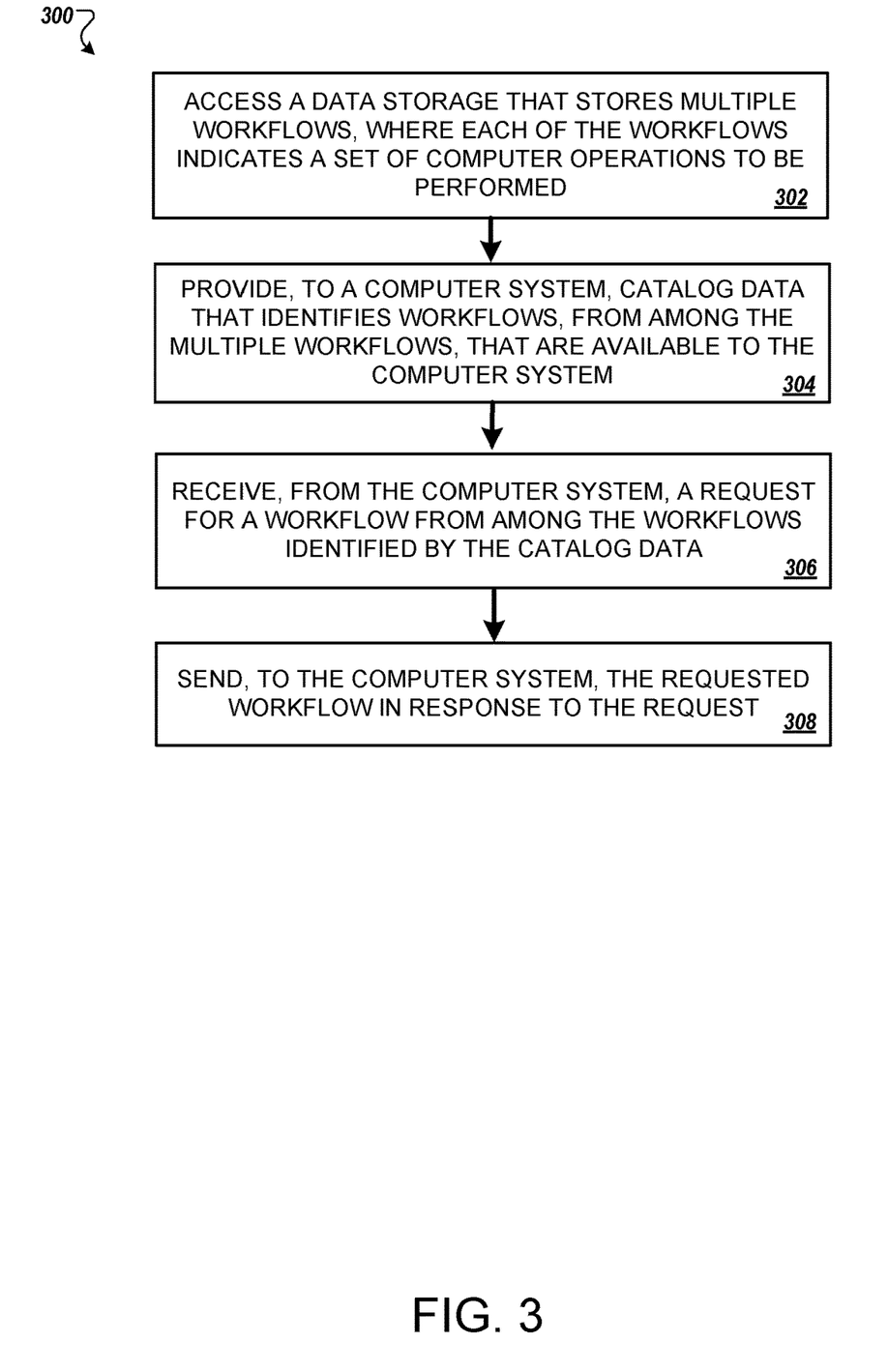
FIG. 3 is an example process for providing workflows to remote environments.

FIG. 3 is an example process 300 for transmitting workflows to remote environments. The process 300 can be performed, at least in part, using the system 100 described herein.

The process 300 includes accessing data storage storing multiple workflows, where each of the workflows indicates a set of computer operations to be performed (302). The computer operations may include downloading software, checking for software updates, updating software, installing software, running software, importing data, exporting data, checking for new or different data, running a script, generating data, generating a notification, sending a notification, etc. The computer operations may be conditional on the satisfaction of one or more requirements. These requirements may include the performance of another operation, the processing of a workflow, a time having elapsed, a triggering event, etc. The data storage may be on-site.

Thee data storage can store metadata associated with the workflows. The metadata for a particular workflow may include information such as a name of the workflow, a purpose of the workflow or an error that the workflow addresses, a description of the operations within the workflow, a list of persons who can access the workflow, security permissions for the workflow, and/or software versions that the workflow is compatible with.

A workflow can indicate a sequence of multiple operations that are to be performed in a predetermined order. Examples of operations include checking a software version of a server, checking the most recent software version, comparing software versions, downloading software, uploading software, identifying data, uploading data, storing data, downloading data, deleting or clearing data, comparing data, determining destinations, and/or determining sources. As an example, a workflow may include an operation to check the version of software currently used by a particular server, to check the most recent version of the software, and to compare the currently used version with the most recent version. In this example, the operations may need to be performed in a predetermined order. For example, the workflow may need to first check the version of software currently used by the server, then check the most recent version of the software once the first check is performed, and, only after both checks are performed, compare the currently used version with the most recent version. The predetermined order may be set when the one or more workflows are initially created, e.g., by the administrator 104. The predetermined order may modified at a third party server, e.g., by the user 124 of the client device 122 or by a different user of a different client device. The predetermined order may be set at a third party server, e.g., by the user 124 of the client device 122 or by a different user of a different client device.

A workflow may include multiple conditional operations that are designated to be performed when corresponding conditions are satisfied. Examples of conditions include the occurrence of an event, the nonoccurrence of an event, particular data being identified, particular data not being identified, particular data being matched, particular data not being matched, the time of day, the day of the week, the time of year, a status of a server, the load on a server, the security permissions of a user, etc.

In some cases, a workflow includes a chain of conditional operations. The chain of conditional operations may include a first operation and a first condition and a second operation and a second condition. Performance of the first operation may be dependent on the first condition being satisfied, and performance of the second operation may be dependent on the second condition and the first condition being satisfied. As an example, when either the first condition or the second condition is not satisfied, the server running the workflow may automatically abort the workflow and/or may automatically restart the workflow, e.g. after a predetermined amount of time. Similarly, when both the first condition and the second condition are not satisfied, the server running the workflow may automatically abort the workflow and/or may automatically restart the workflow, e.g. after a predetermined amount of time. As an example, when the first condition is satisfied but the second condition is not satisfied, the server running the workflow may wait a predetermined amount of time before automatically aborting the workflow or automatically restarting the workflow. During this predetermined amount of time, the server and/or the workflow may check to see if the second condition is satisfied.

A workflow may contain an operation to check a software version used by the server, compare the employed software version with the most recent version of the software, download the most recent software version if the employed version does not match the most recent version, and install the most recent software version if the employed version does not match the most recent version and if the most recent version downloaded successfully. In this example, the first condition may be whether the employed version of the software matches the most recent version of the software. In this example, the second condition may be whether the most recent software version downloaded successfully. A chain of conditional operations may also include additional operations and conditions.

In some cases, one or more workflows specify multiple alternative sequences of operations to be performed based on conditions present when the one or more workflows are processed. The multiple alternative sequences may be mutually exclusive. The computer or server that executes the workflow can determine which sequence of operations is appropriate when the workflow is run. The conditions for determining a sequence of operations to follow may be the same as the conditions for conditional operations. For example, these conditions may include the occurrence of an event, the nonoccurrence of an event, particular data being identified, particular data not being identified, particular data being matched, particular data not being matched, the time of day, the day of the week, the time of year, a status of a server, the load on a server reaching a threshold level, the security permissions of a user, etc. As an example, a workflow may have two alternative sequences of operations, a first sequence to be performed on weekdays and a second sequence to be performed on weekends. When the computer or server runs the workflow, the computer or server may make a determination as to whether it is a weekday or a weekend. If the computer or server determines that it is a weekday, the computer or server will provide for the first sequence of operations in the workflow to be run. Alternatively, if the computer or server determines that it is a weekend, the computer or server will provide for the second sequence of operations in the workflow to be run.

In some cases, one or more workflows specify operations that involve executing one or more scripts or executables. As an example, executables may include programs and certain files, e.g., files that are .BAT, .COM, .EXE, .BIN, .DMG, and/or .APP files. As an example, a script may include a series of commands within a file that is capable of being executed without being compiled. The scripts may include Python scripts, PHP scripts, JavaScript scripts, etc.

In some cases, one or more workflows specify operations that include shutting down or restarting a server environment. The operations may include a restart operation. The operations may include a shutdown operation. As an example, the operations for shutting down or restarting a server environment may be for shutting down or restarting one or more particular computers of the server environment.

In some cases, one or more workflows specify operations that involve accessing data from a data repository or data indicating operational characteristics of a data repository. As an example, a data repository may include a server, e.g. an on-premises server or a third-party server, or part of a server. As an example, a data repository may include a database. As an example, a data repository may include cloud storage that is provided by a cloud-computing platform. As an example, operational characteristics of the data repository may include log data for accesses to the data repository, a status of the data repository (e.g., an indication of whether or not it is experiencing an error or has recently experienced an error), a number of requests for data within the data repository, performance characteristics (e.g., an average time to process requests for data within with data repository, a maximum time, etc.), an indication of the specific data requested from the data repository, an indication of data added to the data repository, one or more dates and times associated with a request for data, one or more dates and times associated with data added to the data repository, etc.

In some cases, one or more workflows represent a template of operations to be customized for a particular server environment. For example, a workflow may include one or more fields that can be filed, customized, or modified. In this example, the one or more fields may be empty and may need to be filled in, e.g., by the user 124 using the user device 122. In this example, the one or more fields may have default values that are automatically set, e.g., by the workflow publishing server 110, or by are set by a user, e.g., the administrator 104 through the administrator device 102. As another example, one or more fields may be added to the workflow to, for example, add additional operations, further define operations, add conditions to operations, etc. The fields may correspond with an operation, with a condition for a conditional operation, with a condition for a particular sequence of operations, with multiple operations, etc. The fields may allow a user to, for example, specify a run time for the workflow, specify one or more server environment on which to run the workflow, add one or more operations, modify one or more existing operations, remove one or more existing operations, rearrange an order of the operations, set an order of the operations, set a hierarchy of the operations, divide the operations into multiple sequences of operations, assign one or more operations to a specific sequence of operations, remove one or more operations from a sequence of operations, etc.

In some cases, one or more workflows address specific errors or conditions of server environments, and have metadata indicating the errors or conditions they address. As an example, the specific errors or conditions may include the cache allocated to a server environment being full or approaching capacity (e.g., 70% full, 80% full, 90% full, etc.), poor performance of the server environment (e.g., unacceptable load times, render times, reporting times, etc.), a server environment crash, the amount of load on the server environment, hardware failure, etc. As an example, the metadata indicating the errors or conditions may include a purpose of the one or more workflows, an error that the one or more workflows address, a description of the operations within the one or more workflows. In addition, metadata such as security permissions may also provide some indication of the errors or conditions that the one or more workflows address.

The process 300 includes providing, to a computer system, catalog data identifying workflows, from among the multiple workflows, that are available to the computer system (304). The catalog data may include or be a workflow listing, e.g. workflow listings 114*a* or 114*b* as shown in FIG. 1. The catalog data may identify a set of workflows. The catalog data may contain one or more workflow libraries, e.g. workflow library 106 as shown in FIG. 1). The catalog data may be a workflow library. The catalog data may contain metadata that corresponds to one or more workflows. The metadata may include a name of the one or more workflows, a purpose of the one or more workflows or an error that the one or more workflows address, a description of the operations within the one or more workflows (e.g., which may also include required conditions for operation performance), a list of persons who can access the one or more workflows, security permissions for the one or more workflows, and software versions that the one or more workflows are compatible with. In some implementations, the identified workflows are those workflows that are compatible with the computer system. The computer system may be a server, a group of servers, a server system, or a server environment (e.g., the server 120 as shown in FIGS. 1A-1B). The computer system may be part of a cloud-computing service or environment.

In some cases, providing the catalog data includes publishing the catalog data to multiple systems. As an example, the multiple systems may include one or more server systems, server environments, computer systems, etc. For example, the multiple systems may include the server 120 and the server 130 shown in FIG. 1. As an example, the catalog data may be published over a public or private network such as the Internet.

In some cases, providing the catalog data includes pushing the catalog data to one or more systems. For example, the catalog data may be pushed by the workflow publishing server 110 shown in FIG. 1. As an example, the one or more systems may include one or more server systems, server environments, computer systems, etc. In this example, the one or more computer systems may include or be part of one or more server systems or server environments. For example, the one or more systems may include the server 120 and/or the server 130 shown in FIG. 1.

In some cases, the catalog data includes metadata associated with each of the workflows. The metadata may indicate software the associated workflow applies to, conditions the associated workflow applies to, permissions needed for the associated workflow, a description for the associated workflow, and/or an error addressed by the associated workflow. As an example, conditions that a workflow applies to or errors addressed by the workflow may include conditions or errors experienced by a server system or environment running the workflow. In this example, the conditions may include the cache allocated to a server environment being full or approaching capacity (e.g., 70% full, 80% full, 90% full, etc.), poor performance of the server system or environment (e.g., unacceptable load times, render times, reporting times, etc.), a server system or environment crash, the amount of load on the server system or environment, hardware failure, etc. As an example, the permissions needed for the associated workflow may include security permissions. In this example, security permissions may include a full control permission, a modify permission, a read and execute permission, a write permission, etc. As an example, a user of the server system or server environment may be assigned one or more permissions, e.g. by an administrator of the server system or server environment.

The metadata of the workflows may be used by the computer system in performing actions or in preventing actions from being performed. For example, the metadata associated with a workflow may be used by the computer system to prevent some users from running the workflow on the computer system if they do not have the requisite permission level as indicated by the metadata. As another example, the metadata indicating a software associated with a workflow may be used by the computer system to prevent the workflow from being run if the workflow is no longer compatible with the computer system, e.g. where the software on the computer system has been updated or upgraded since the workflow was downloaded from the workflow publishing server 110 shown in FIG. 1. Similarly, a user of the computer system may use the metadata indicating the software to ensure that the workflow is compatible. A user of the computer system may adjust or modify the metadata of a workflow. For example, a user may change the conditions, permissions, description, and/or error addressed of a particular workflow.

The process 300 includes receiving, from the computer system, a request for a workflow from among the workflows identified by the catalog data (306). The request may specifically name or otherwise identify one or more workflows from the workflows identified by the catalog data. In some implementations, the request does not specifically name or specifically identify one or more workflows. In these implementations, the request may contain a query. The query may include information naming or describing a specific error, condition, or other issue experienced by the computer system. The query information may be compared to metadata corresponding to the multiple workflows. In comparing the query information to the workflow metadata, the system (e.g., the system 100 as shown in FIGS. 1A-1B) or a part of the system (e.g., the workflow publishing server 110 as shown in FIGS. 1A-1B) may identify one or more workflows of the multiple workflows that specifically address the error, condition, or other issue experienced by the computer system, and/or one or more workflows that are related to the error, condition, or other issue experienced by the computer system. The system (e.g., the system 100 as shown in FIGS. 1A-1B) or a part of the system (e.g., the workflow publishing server 110 as shown in FIGS. 1A-1B) may leverage one or more machine learning in identifying the one or more workflows of the multiple workflows.

The process 300 includes sending, to the computer system, the requested workflow in response to the request (step 308). The requested workflow may be sent to the computer system over a network. The system (e.g., the system 100 as shown in FIGS. 1A-1B) or a part of the system (e.g., the workflow publishing server 110 as shown in FIGS. 1A-1B) may check to confirm that the workflow requested is compatible with the computer system before sending.

The process 300 optionally includes receiving a request for catalog data. In these cases, providing the catalog data includes providing the catalog data in response to receiving the request for catalog data. For example, the catalog data may be provided by the workflow publishing server 110 shown in FIG. 1 to the server 120 in response to a request for the catalog data being sent by the server 120 to the workflow publishing server 110. The request for the catalog data and the catalog data may be sent over a public or private network such as the internet.

The process 300 optionally includes identifying a configuration of the computer system, and providing a customized subset of the workflows based on the configuration of the computer system. As an example, the configuration of the computer system may include one or more characteristics of the computer system. As an example, the configuration of the computer system may indicate software installed on the computer system, versions of the software installed, configuration settings of the computer system, load levels experienced by the computer system, usage logs of the computer system, error logs of the computer system, and so on. As an example, in providing a customized subset of workflows, the workflow publishing server 110 shown in FIG. 1 can filter the workflows to identify those that are compatible with the configuration of the computer system, or are compatible with one or more characteristics of the configuration of the computer system.

In some cases, providing a customized subset of the identified workflows is based on a software version for software used by the computer system, a setting of the computer system, a usage pattern of the computer system, an error encountered by the computer system, and/or a limitation encountered by the computer system. For example, each workflow that is compatible with a first version of a particular software, e.g. version 2.1, may be placed in the subset, e.g. by the workflow publishing server 110 shown in FIG. 1. In this example, the first version of the software may be the version used by the computer system, e.g. a server, requesting the workflows.

As an example, settings may include configuration settings. In this example, all workflows that are compatible with the configuration settings may be placed in the subset. The configuration settings may correspond with the computer system. The configuration settings may include, for example, a cache size of the computer system, memory allocated to the computer system, processors allocated to the computer system, bandwidth of the computer system, software used by computer system, software versions used by the computer system, etc.

As an example, usage patterns may include operation patterns associated with users of the computer system. The usage patterns may be determined by the workflow publishing server 110 shown in FIG. 1 by, for example, leveraging one or more machine learning. The usage patterns may indicate, for example, operations frequently performed by users of the computer system, operations that are frequently performed together, operations that typically follow an earlier operation, operations are typically performed during a particular state of the computer system (e.g., particular date, particular time of the day, particular load level on the computer system or threshold load level being reached, etc.), etc.

As an example, errors encountered by the computer system may include the cache allocated to computer system being full or approaching capacity (e.g., 70% full, 80% full, 90% full, etc.), poor performance of the computer system (e.g., unacceptable load times, render times, reporting times, etc.), the computer system experiencing a crash, the amount of load on the computer system reaching a threshold level, hardware failure, etc. In determining whether the computer system has encountered an error, as an example, the workflow publishing server 110 may analyze error reports, error logs, and/or server manager logs of the computer system in order to identify errors encountered by the computer system. In analyzing error reports, error logs, and/or server manager logs, the workflow publishing server 110 may, for example, leverage one or more machine learning.

The process 300 optionally includes receiving information, from the computer system, indicating a log of actions performed by the computer system, determining a level of similarity of actions in the log with operations in a workflow of the multiple workflows, determining that the level of similarity satisfies a threshold; and providing, to the computer system, the workflow or a recommendation for the workflow based on determining that the level of similarity satisfies the threshold. As an example, the information may include usage logs or server manager logs. As an example, determining a level of similarity may include determining whether a first operation performed by the computer system is found in a workflow, determining whether one or more operations performed by the computer system before or after performing the first operation are also found in the workflow, determining whether the workflow includes any operations that are not performed by the computer system, determining whether the workflow does not include any operations that are performed by the computer system, determining whether the workflow does not include any operations within a subset of operations performed by the computer system (e.g., those operations surrounding the first operations, a group of operations that are frequently performed together on the computer system, etc.), determining if the conditions for an operation performed by the computer system are the same or similar to the conditions for performing a corresponding operation found in a workflow, etc. In determining a level of similarity, as an example, the workflow publishing server 110 shown in FIG. 1 may leverage one or more machine learning. The threshold may be set by a user. The threshold may be set to, for example, 60%, 70%, 80%, or 90% similarity.

The process 300 optionally includes receiving data, from the computer system, indicating errors or conditions of a server system, identifying one or more workflows of the multiple workflows that are configured to address the errors or conditions, and providing, to the computer system, the workflow or a recommendation for the workflow. As an example, the data may include usage logs, error reports, error logs, and/or server manager logs. In identifying one or more workflows, as an example, the workflow publishing server 110 may leverage one or more machine learning.

The process 300 optionally includes receiving a query from the computer system, determining a workflow of the multiple workflows based on the query, and providing, to the computer system, the workflow or a recommendation for the workflow in response to receiving the query. As an example, a query may be or include a request for a catalog of available workflows, a request for one or more identified workflows, a request for compatible or recommended workflows, etc. The query may include, for example, an indication of one or more specific workflows. The query may include, for example, one or more criteria for workflows that are to be used in identifying one or more workflows to be sent to the computer system in response. The query may include information corresponding with the computer system such as, for example, configuration settings of the computer system. In some cases, the query may be include a request for documents, e.g. from the workflow publishing server 110 shown in FIG. 1. In these cases, the workflow publishing server 110 may identify one or more workflows that correspond with the requested documents, and may send the identified one or more workflows to the computer system or may send a recommendation including an indication of the identified workflows to the computer system.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:
   accessing data storage storing multiple workflows, wherein each of the workflows indicates a set of computer operations to be performed;
   providing, to a computer system, catalog data identifying workflows, from among the multiple workflows, that are available to the computer system;
   receiving, from the computer system, a request for a workflow from among the workflows identified by the catalog data; and
   sending, to the computer system, the requested workflow in response to the request.

2. The method of claim 1, wherein providing the catalog data identifying the workflows includes publishing the catalog data to multiple systems, one of which is the computer system.

3. The method of claim 1, wherein providing the catalog data identifying the workflows includes pushing, by a server, the catalog data to the computer system.

4. The method of claim 1, further comprising receiving a request for the catalog data;
   wherein providing the catalog data identifying the workflows includes providing, to the computer system, the catalog data in response to receiving the request for the catalog data.

5. The method of claim 1, wherein:
   the data storage storing multiple workflows stores metadata associated with the multiple workflows; and
   the catalog data includes metadata associated with each of the identified workflows, the metadata indicating at least one of:
     software the associated workflow applies to,
     conditions the associated workflow applies to,
     permissions needed for the associated workflow,
     a description for the associated workflow, or
     an error addressed by the associated workflow.

6. The method of claim 1, wherein one or more workflows of the multiple workflows indicate a sequence of multiple operations to be performed in a predetermined order.

7. The method of claim 1, wherein one or more workflows of the multiple workflows includes multiple conditional operations that are designated to be performed when corresponding conditions are satisfied.

8. The method of claim 1, wherein one or more workflows of the multiple workflows includes a chain of conditional operations comprising (i) a first operation and a first condition and (ii) a second operation and a second condition,
   wherein the performance of the first operation is dependent on the first condition being satisfied; and
   wherein the performance of the second operation is dependent on the second condition and the first condition being satisfied.

9. The method of claim 1, wherein one or more workflows of the multiple workflows specify multiple alternative sequences of operations to be performed based on conditions present when the one or more workflows are processed.

10. The method of claim 1, wherein one or more workflows of the multiple workflows specify operations that involve executing one or more scripts or executables.

11. The method of claim 1, wherein one or more workflows of the multiple workflows specify operations that include shutting down or restarting a server environment.

12. The method of claim 1, wherein one or more workflows of the multiple workflows specify operations that involve accessing data from a data repository or data indicating operational characteristics of a data repository.

13. The method of claim 1, wherein at least one of the workflows of the multiple workflows represents a template of operations to be customized for a particular server environment.

14. The method of claim 1, wherein one or more workflows of the multiple workflows address specific errors or conditions of server environments, and have metadata indicating the errors or conditions they address.

15. The method of claim 1, further comprising:
identifying a configuration of the computer system; and
providing a customized subset of the identified workflows based on the configuration of the computer system.

16. The method of claim 15, wherein providing a customized subset of the identified workflows is based on at least one of:
a software version for software used by the computer system,
a setting of the computer system,
a usage pattern of the computer system,
an error encountered by the computer system, or
a limitation encountered by the computer system.

17. The method of claim 1, further comprising:
receiving information, from the computer system, indicating a log of actions performed by the computer system;
determining a level of similarity of actions in the log with operations in a workflow of the multiple workflows;
determining that the level of similarity satisfies a threshold; and
providing, to the computer system, the workflow or a recommendation for the workflow based on determining that the level of similarity satisfies the threshold.

18. The method of claim 1, further comprising:
receiving data, from the computer system, indicating errors or conditions of a server system;
identifying one or more workflows of the multiple workflows that are configured to address the errors or conditions; and
providing, to the computer system, the workflow or a recommendation for the workflow.

19. A system comprising:
one or more computers; and
one or more computer-readable media storing instructions that, when executed, cause the one or more computers to perform operations comprising:
accessing data storage storing multiple workflows, wherein each of the workflows indicates a set of computer operations to be performed;
providing, to a computer system, catalog data identifying workflows, from among the multiple workflows, that are available to the computer system;
receiving, from the computer system, a request for a workflow from among the workflows identified by the catalog data; and
sending, to the computer system, the requested workflow in response to the request.

20. One or more non-transitory computer-readable media storing instructions that, when executed by one or more computers, cause the one or more computers to perform operations comprising:
accessing data storage storing multiple workflows, wherein each of the workflows indicates a set of computer operations to be performed;
providing, to a computer system, catalog data identifying workflows, from among the multiple workflows, that are available to the computer system;
receiving, from the computer system, a request for a workflow from among the workflows identified by the catalog data; and
sending, to the computer system, the requested workflow in response to the request.

* * * * *